(12) United States Patent
Bucksch et al.

(10) Patent No.: US 12,525,902 B2
(45) Date of Patent: Jan. 13, 2026

(54) SHUNTLESS MOTOR CONTROL FOR DC MOTORS

(71) Applicant: Infineon Technologies AG, Neubiberg (DE)

(72) Inventors: Thorsten Bucksch, Munich (DE); Aneel Aneel, Munich (DE); Chintu Seth, Munich (DE)

(73) Assignee: Infineon Technologies AG, Neubiberg (DE)

( * ) Notice: Subject to any disclaimer, the term of this patent is extended or adjusted under 35 U.S.C. 154(b) by 159 days.

(21) Appl. No.: 18/392,189

(22) Filed: Dec. 21, 2023

(65) Prior Publication Data

US 2025/0211143 A1 Jun. 26, 2025

(51) Int. Cl.
*H02M 7/5387* (2007.01)
*H02M 1/32* (2007.01)
*H02P 6/08* (2016.01)
*H02P 21/22* (2016.01)

(52) U.S. Cl.
CPC ............ *H02P 6/085* (2013.01); *H02M 1/327* (2021.05); *H02P 21/22* (2016.02)

(58) Field of Classification Search
CPC .. H02M 7/5387; H02M 1/0009; H02M 1/327; H02P 21/22; H02P 6/085
USPC ...................................................... 318/400.1
See application file for complete search history.

(56) References Cited

U.S. PATENT DOCUMENTS

| | | | | |
|---|---|---|---|---|
| 2018/0123495 A1* | 5/2018 | Bäurle | ....................... | H02P 6/14 |
| 2018/0301982 A1* | 10/2018 | Alfawy | ................... | H02M 1/38 |
| 2021/0021121 A1* | 1/2021 | Lee | ......................... | G01R 31/27 |
| 2021/0099116 A1* | 4/2021 | Krishnamurthy | ........ | G01R 1/20 |
| 2021/0408939 A1* | 12/2021 | Hain | ..................... | H02M 7/539 |
| 2022/0416766 A1* | 12/2022 | Krug | ....................... | H03K 3/011 |
| 2023/0327588 A1* | 10/2023 | Tan | ........................... | H02P 6/22 |
| | | | | 318/400.17 |

FOREIGN PATENT DOCUMENTS

WO WO-2023192695 A1 * 10/2023 .............. H02P 1/465

OTHER PUBLICATIONS

"G6K Surface Mounting Relay", Retrieved from: https://asset.conrad.com/media10/add/160267/c1/-/en/002593900DS00/datenblatt-2593900-omron-g6k-2p-y-dc12-printrelais-12-vdc-1-a-2-wechsler-1-st-bag.pdf, Accessed on: Sep. 21, 2023, 10 pp.

* cited by examiner

*Primary Examiner* — Gabriel Agared
(74) *Attorney, Agent, or Firm* — Shumaker & Sieffert, P.A.

(57) ABSTRACT

In some examples, a method comprises controlling power switches to deliver a current to an electric motor, wherein the power switches are arranged in a bridge (e.g., an H-bridge or an h-bridge) comprising a first high-side power switch, a first low-side power switch, and a second low-side power switch. Controlling the power switches to deliver the current to the electric motor may include controlling the first high-side power switch ON and controlling the second low-side power switch ON, wherein the current to the electric motor flows through the high-side power switch and through the second low-side power switch. The method may comprise determining the current to the electric motor based on a voltage drop over one of the power switches arranged in the bridge. One or more aspects of the method may be performed during dead time.

19 Claims, 5 Drawing Sheets

SHUNTLESS MOTOR CONTROL FOR DC MOTORS

TECHNICAL FIELD

This disclosure relates to motor control using a bridge circuit, such as an H-bridge circuit, and more specifically, techniques for measuring current through an electric motor without using a shunt.

BACKGROUND

Power switches are used in a wide variety of applications in order to control power being delivered to a load, such as an electric motor. As examples, a power switch may comprise a Field Effect Transistor (FET), an insulated gate bipolar transistor (IGBT), a bipolar junction transistor (BJT), or another type of power transistor. Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, PMOS, NMOS, DMOS, or any other type of MOSFET, or any combination of the same. MOSFETs may be formed in silicon, gallium nitride, silicon carbide, or other materials.

Power switches are typically controlled by a driver circuit via a pulse modulation (PM) signals. PM signals generally refer to pulse width modulation (PWM) signals, pulse frequency modulation (PFM) signals, pulse duration modulation signals, pulse density modulation signals, or another type of modulated control signal used to control a power switch. PM control signals may be generated by a processor and communicated to a driver circuit. The driver circuit may amplify the PM control signals to generate PM drive signals, which can be applied to the gate of a power switch so as to control on/off switching of the power switch, and thereby control the average amount of power delivered through the power switch to a load. The on/off switching of the power switch effectively chops its power delivery up into discrete parts. The average value of voltage and/or current fed to a load can be controlled by turning the switch ON and OFF at a fast rate. The longer the switch is on compared to the off periods, the higher the total power supplied to the load.

In many applications, two different power switches are configured in a high-side and low-side configuration, and the ON-OFF switching of the two power switches is synchronized in order to deliver the desired power to a switch node positioned between the high-side and low-side switch. H-bridge circuits are often used for controlling direct current (DC) motors, such as brushless direct current (BLDC) motors. H-bridge circuits include two high-side switches and two low-side switches that form an H-bridge. Current can be delivered through a first high-side switch to an electric motor and through second low-side switch to ground. In some examples, for reverse operation of the motor, current can be delivered through a second high-side switch to the electoral motor and through a first low-side switch to ground. In other cases, a second high-side switch is not necessarily needed or used, e.g., if reverse motor control is not desired or supported. An h-bridge (in contrast to an H-bridge) refers to bridge circuit that includes a first high-side power switch and two low-side power switches, but lacks the second high-side power switch.

It is often desirable or necessary to monitor current through an electric motor, e.g., as part of a regulation loop for controlling the electric motor. For such current monitoring, a shunt resistor is typically used. The shunt is commonly connected to the H-bridge circuit, e.g., between the low-side switches and ground. Shunts for measuring current are relatively expensive components, and the use of shunt for current measuring purposes in motor control can created challenges or limitations for layout of other circuit components.

SUMMARY

This disclosure describes methods and techniques for measuring current through an electric motor without using a shunt resistor. A bridge circuit of power switches (e.g., an H-bridge) may be used to control the electric motor, and according to this disclosure, measured parameters through the power switches (e.g., a measured voltage drop over a power switch) may be used to determine a level of current through the electric motor. The described processes can eliminate the need for a shunt resistor and instead, may leverage the power switches themselves in lieu of using a shunt.

The techniques may leverage known or knowable relationships between different power switches in the bridge circuit, and the techniques may also use known or knowable relationships between power switch junction temperatures, power switch resistance, and current through a given power switch. Moreover, the techniques may utilize an iterative process for determining the junction temperature of a power switch, which may be based on an initial assumption, and based on iterative calculations that refine that assumption as the process iterates. In some examples, each iteration of the iterative process for determining a power switch junction temperature may correspond to a pulse modulation control cycle associated with the power switches, which can simplify the process. A level of current through the electric motor may be determined based at least in part on the determined junction temperature associated with a power switch in the motor control bridge.

In some examples, this disclosure describes a method that comprises controlling power switches to deliver a current to an electric motor, wherein the power switches are arranged in a bridge (e.g., an H-bridge or an h-bridge) comprising a first high-side power switch, a first low-side power switch, and a second low-side power switch. Controlling the power switches to deliver the current to the electric motor may include controlling the first high-side power switch ON and controlling the second low-side power switch ON, wherein the current to the electric motor flows through the high-side power switch and through the second low-side power switch. The method may comprise determining the current to the electric motor based on a voltage drop over one of the power switches arranged in the bridge. Moreover, as described in greater detail below, a process of determining the current may include specific steps that are performed during so-called "dead time" when both the first high-side power switch and the first low-side power switch are intentionally controlled OFF to eliminate any possibility of cross-conductance over the bridge circuit.

In some examples, this disclosure describes a processor configured to control power switches to deliver a current to an electric motor, wherein the power switches are arranged in a bridge comprising a first high-side power switch, a first low-side power switch, and a second low-side power switch, wherein controlling the power switches to deliver the current to the electric motor includes controlling the first high-side power switch ON and controlling the second low-side power switch ON, wherein the current to the electric motor flows through the high-side power switch and through the second low-side power switch. The processor may be configured to determine a current through the electric motor based on a voltage drop over one of the power switches arranged in the H-bridge.

Details of these and other examples are set forth in the accompanying drawings and the description below. Other features, objects, and advantages will be apparent from the description and drawings, and from the claims.

DETAILED DESCRIPTION

This disclosure describes methods and techniques for measuring current through a direct current (DC) electric motor without using a shunt resistor. For example, the DC electric motor may comprise a brushless DC (BLDC) motor. A bridge circuit of power switches (e.g., an H-bridge or an h-bridge) may be used to control the electric motor, and according to this disclosure, measured parameters through the power switches (e.g., a measured voltage drop over a power switch) may be used to determine a level of current through the electric motor. Essentially, the described processes can eliminate the need for a shunt resistor and may leverage the power switches themselves in lieu of a shunt.

In some examples, the techniques of this disclosure may leverage known or knowable relationships between different power switches in the bridge circuit, and the techniques may also use known or knowable relationships between power switch junction temperatures, power switch resistance, and current through a given power switch. Moreover, the techniques may utilize an iterative process for determining the junction temperature of a particular power switch, which may be based on an initial assumption and based on iterative calculations that refine that assumption as the process iterates. In some examples, each iteration of the iterative process for determining a power switch junction temperature may correspond to a pulse modulation control cycle associated with the power switches, which can simplify the process of identifying the final result. A level of current through the electric motor may be determined (e.g., via a lookup table) based on the determined junction temperature associated with a power switch in the motor control bridge.

Figure 1:
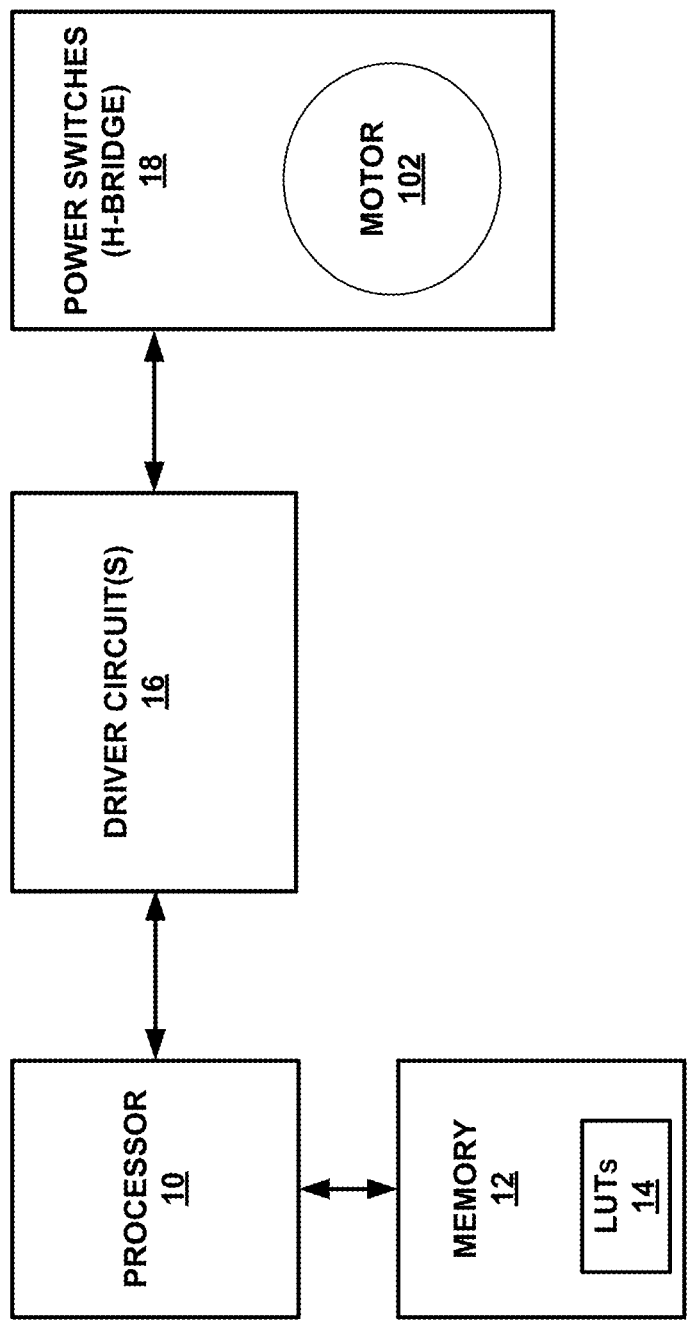
FIG. 1 is a block diagram of a system configured to control an electric motor consistent with this disclosure.

FIG. 1 is a block diagram of a system configured to control an electric motor 102 consistent with this disclosure. Electric motor 102 may be controlled by a bridge circuit comprising power switches 18 arranged in an H-bridge or an h-bridge. In some examples, power switches 18 may include two high-side switches and two low-side switches that form an H-bridge. Current can be delivered through a first high-side switch to an electric motor and through second low-side switch to ground. In some examples, for reverse operation of the motor, current can be delivered through a second high-side switch to the electoral motor and through a first low-side switch to ground. In some examples, however, a second high-side switch is not necessarily needed or used, e.g., if reverse motor control is not desired or supported. An h-bridge (in contrast to an H-bridge) refers to bridge circuit that includes a high-side power switch and two low-side power switches, but lacks the second high-side power switch. In still other examples, power switches 18 may form an H-bridge with the second high-side power switch being always turned OFF, such that the H-bridge operates as an h-bridge.

Processor 10 may send control signals to one or more driver circuit(s) 16. Driver circuit(s) 16 may define pulse modulation (PM) for power switches 18, e.g., pulse width modulation (PWM) signals, based on the control signals from processor 10. For example, the control signals from processor 10 may indicate frequencies, duty cycles, and/or gate voltages for PWM signals. Driver circuit(s) 16 output PM drive signals to the gates of power switches 18 in order to control the level of current delivered to electric motor 102. In general, processor 10 is configured to send commands to one or more driver circuit(s) 16 to cause the one or more driver circuits to generate PM signals to be applied at gates of power switches 18.

Processor 10 may be connected to a memory 12, which may store one or more lookup tables (LUTs) 14. As described in more detail blow, LUTs 14 may store mappings between values associated with two different power switches, and the mappings may be defined during production testing of the power switches. For example, the techniques of this disclosure may determine or estimate a junction temperature of one of the power switches 18 in the H-bridge by determining a voltage drop over a body diode and mapping that voltage drop to a temperature. This determined junction temperature of one power switch in the H-bridge can then be used to determine the junction temperature of a different one of the power switches 18 in the H-bridge (e.g., based on an offset identified in production testing or manufacturing testing). Thus, in one aspect of this disclosure, temperature estimates of one power switch can be used to determine temperature estimates of a different power switch in the same bridge circuit, and this determination may be part of a current estimation/determination process. Other types of mappings can also be used.

Processor 10 may then use the determination of junction temperature of a particular one of power switches 18 to determine its on-resistance, e.g., RDS(on). Furthermore, with the RDS(on) value, a measurement of the voltage drop over that power switch then can used to determine the current through the electrical motor. The RDS(on) determinations based on junction temperature may comprise an iterative process as described in greater detail herein.

Processor 10 may be configured to control power switches 18 to deliver a current to electric motor 102 by controlling driver circuit(s) 16 to cause driver circuits to issue PWM signals to power switches 18. Power switches 18 may arranged in a bridge comprising a first high-side power switch, a first low-side power switch, and a second low-side power switch. Again, a second high-side power switch is optional and may be included if reverse motor operation is desired.

Controlling the power switches to deliver the current to electric motor 102 may include controlling a first high-side power switch ON and controlling the second low-side power switch ON, wherein the current to the electric motor flows through the high-side power switch, through electric motor 102, and through the second low-side power switch. Moreover, rather than using a shunt, according to this disclosure, processor 10 may be configured to determine a current through electric motor 102 based on a voltage drop over one of the power switches (e.g., one of power switches 18) arranged in the bridge.

For example, the voltage drop over one of the power switches used to determine current through the electrical motor may comprise a voltage drop over a second low-side power switch (referred to as LS2 herein). Processor 10 may be configured to determine a junction temperature associated with the second low-side power switch (LS2) based on the junction temperature associated with the first low-side power switch (LS1) and an offset value. The offset value may map junction temperature of LS1 to junction temperature of LS2, and the offset value may be identified during production and stored in memory 12.

Processor 10 may determine an ON resistance associated with the second low-side power switch (LS2) based on the junction temperature associated with the second low-side power switch, and processor 10 may determine the current through the electric 102 motor based on the voltage drop over the second low side power switch and the ON resistance associated with the second low-side power switch. For example, processor 10 may be configured to determine the junction temperature associated with the first low-side power switch by performing a first lookup operation into LUTs 14 based on the voltage drop over the body diode of the first low-side power switch during the dead time, and determine the ON resistance associated with the second low-side power switch based on the junction temperature associated with the second low-side power switch by performing a second lookup operation into LUTs 14 based on the junction temperature associated with the second low-side power switch.

Figure 2:
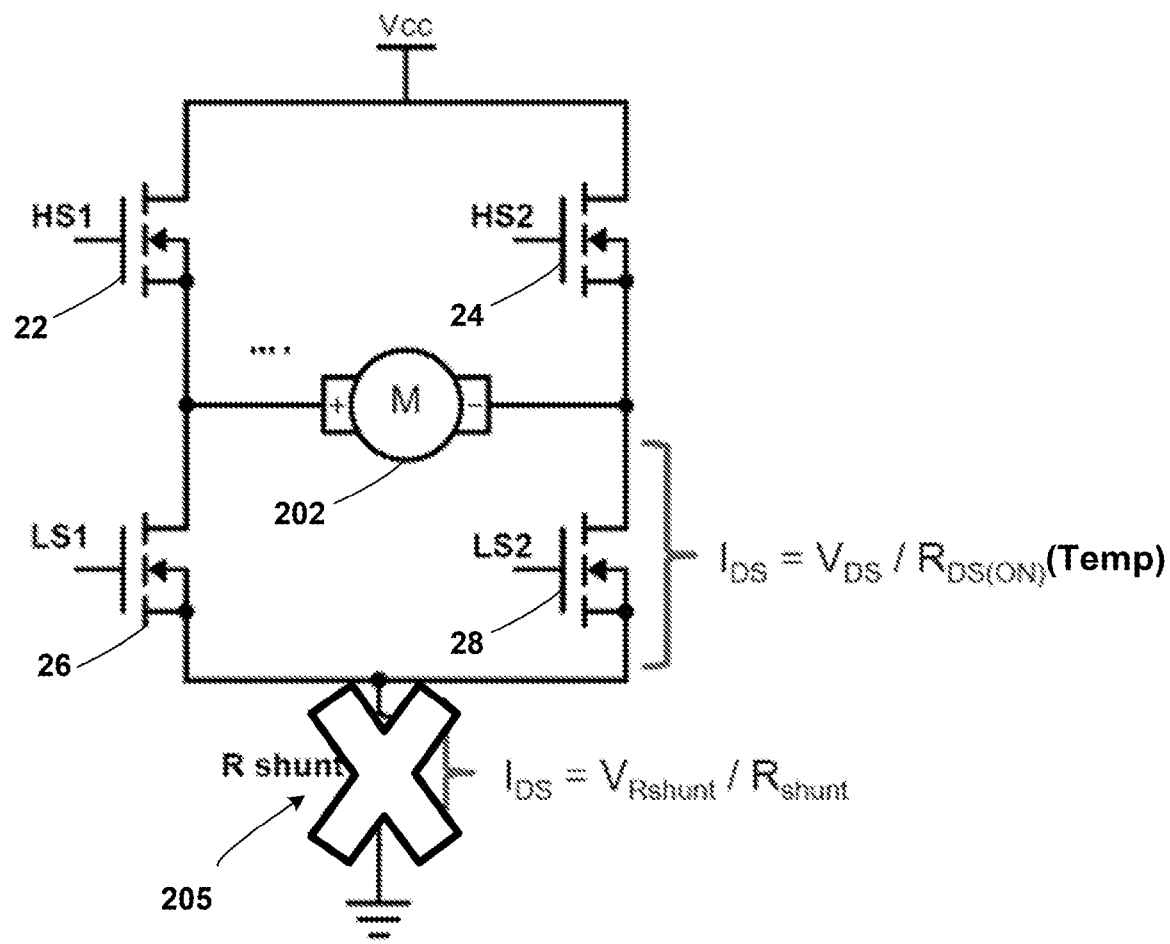
FIG. 2 is a circuit diagram showing power switches arranged in an H-bridge for controlling an electric motor.

FIG. 2 is a circuit diagram of four power switches 22, 24, 26, 28 arranged in an H-bridge for controlling electric motor 202. FIG. 2 may generally illustrate one example of power switches 18 and electric motor 102 shown in FIG. 1. In other words, electric motor 202 of FIG. 2 may correspond to electric motor 102 in FIG. 1, and power switches 22, 24, 26, 28 of FIG. 2 may correspond to power switches 18 shown in FIG. 1.

In some examples, determining a voltage drop over one of the power switches 18 may comprise determining a voltage drop over a body diode of one of the power switches 18. In some examples, to determine the current through electric motor 102, 202 without using a shunt resistor, processor 10 may be configured to: after controlling power switches 22, 24, 26, 28 to deliver the current to electric motor 202, determine a voltage drop over a body diode of the first low-side power switch 26 during a dead time, wherein a first high-side power switch 22 and the first low-side power switch 26 are controlled OFF during the dead time. This so-called "dead time" is part of the PWM control where both high-side power switch 22 and first low-side power switch 26 are purposefully turned OFF for a brief period to ensure that there is no cross-conductance through power switches 22, 26 directly from a supply to ground. During this dead-time, processor 10 may be configured to determine a junction temperature associated with first low-side power switch 26 based on the determined voltage drop over the body diode of first low-side power switch 26 during the dead time and determine the current to electric motor 202 and through the second low-side power switch 28 based on the determined junction temperature associated with first low-side power switch 26. LUTs 14 may store mappings of junction temperature of first low-side power switch 26 to measured voltage drops over the body diode of first low-side power switch 26. The junction temperature of first low-side power switch 26 can then be used to determine the junction temperature of second low-side power switch 28 based on an offset that is defined or determined during production of the bridge circuit. Then, the temperature of second low-side power switch 28 can be used to define the on resistance, i.e., "RDS(on)," of the second low-side power switch 28. The voltage drop through second low-side power switch 28 when the motor is operating can then be used (along with the RDS(on) value) to determine the current through electric motor 202 when the motor is operating.

Power switches 22, 24, 26, 28 each include a body diode, which refers to a parasitic "reverse" diode whereby power switches 22, 24, 26, 28 operate as reverse diodes when turned OFF. As explained in greater detail below, the body diode of the first low-side power switch 26 experiences a free-wheeling current caused by free-wheeling rotation of electric motor 202 during the dead time. The current through the electric motor corresponds to the current $I_{DS}$ through the second low-side power switch 28. The current through second low-side power switch 28 may be given by:

$$I_{DS} = V_{DS}/R_{DS(ON)}$$

where $I_{DS}$ refers to the drain to source current of second low-side power switch 28, $V_{DS}$ refers to the drain to source voltage of second low-side power switch 28, and $R_{DS(ON)}$ refers to the resistance of second low-side power switch 28. $R_{DS(ON)}$ is dependent on junction temperature, and hence, to determine $R_{DS(ON)}$ of second low-side power switch 28, the junction temperature is needed. Processor 10 can determine junction temperature of first low-side power switch 26 during the dead time, as noted above, and this junction temperature of first low-side power switch 26 can be used to determine the junction temperature of second low-side power switch 28 by adding a pre-defined offset value.

In some examples, processor 10 may use an iterative process in order to determine the junction temperature associated with first low-side power switch 26. For example, processor 10 may be configured to determine D1, where D1 comprises an estimate of the junction temperature associated with first low-side power switch 26 based on an assumption of a current level. Processor 10 may then determine D2, where D2 comprises an ON resistance associated with first low-side power switch 26 based on the determined estimate of junction temperature. Processor 10 may then determine D3, where D3 comprises a new assumption of the current level based on the determined ON resistance. By iterating this process of determining D1, determining D2, and determining D3 for N cycles, wherein N is a positive integer greater than 2, processor 10 can determine an accurate estimation of the junction temperature associated with first low-side power switch 26 after N cycles. The value of N may be identified by production testing to identify the number of cycles N needed to achieve an accurate estimate of junction temperature. Then, as noted above, the determined junction temperature of first low-side power switch 26 can be used to define to a corresponding junction temperature of second low-side power switch 28 by adding an offset. Moreover, the junction temperature of second low-side power switch 28 can be used to determine $R_{DS(ON)}$ of second low-side power switch 28, which along with a measurement of $V_{DS}$, can provide for a determination of $I_{DS}$ without the need for any shunt resistor.

To iterate the determine D1, the determine D2, and the determine D3 for N cycles processor 10 may be configured to iterate calculations according to equations:

$$T = \frac{aV_B}{\ln\left(\frac{I}{I_{sat}}\right)} + b$$

$$R_{DSon} = f(T)$$

$$I = \frac{V_D}{RDSon}$$

wherein: T represents the junction temperature, a represents a first predefined constant, b represents a second predefined constant, ln represents a natural logarithm function, $I_{sat}$ represents a current level where saturation occurs in the first low-side power switch, $V_B$ represents the voltage drop over the body diode of the first low-side power switch during the dead time, $R_{DSon}$ represents a drain-to-source resistance of the first low-side power switch in an ON state, f(T) represents a function based on T, I represents the current level, and $V_D$ represents a voltage drop over the second low-side power switch. In some examples, processor 10 may be configured to automatically iterate during PM cycles applied to first low-side power switch 26, such that a final determination of the junction temperature can be defined by processor 10 in an Nth pulse modulation cycle, wherein N is pre-defined based on production testing. Thus, by determining the number of iterations needed to converge on the junction temperature measurement, processor 10 can merely identity the junction temperature defined by the Nth pulse modulation cycle as being an accurate estimation of junction temperature of first low-side power switch 26.

FIGS. 3A-3D are circuit diagrams showing an exemplary H-bridge circuit configured to control an electric motor 302 according to this disclosure. Motor 302 may correspond to motor 202 of FIG. 2 or motor 102 of FIG. 1. Power switches 32, 34, 36, 38 may correspond to power switches 22, 24, 26, 28 of FIG. 2 or power switches 18 of FIG. 1. Power switch 32 is also referred to as high-side 1 (HS1), power switch 34 is also referred to as high-side 2 (HS2), power switch 36 is also referred to as low-side 1 (LS1) and power switch 38 is also referred to as low-side 2 (LS2). Second high-side power switch 34 is optional and may be included only if reverse motor operation of electric motor 302 is supported. In some cases, second high-side power switch 34 is included but always controlled OFF such that the H-bridge operates as an h-bridge. High-side power switches 32, 34 may be coupled to a supply voltage source and low-side power switches 36, 38 may be coupled to ground voltage or another reference voltage. Power switches 32, 34, 36, 38 are controlled to deliver current from the supply, through electric motor 302, to ground.

Figure 3A:
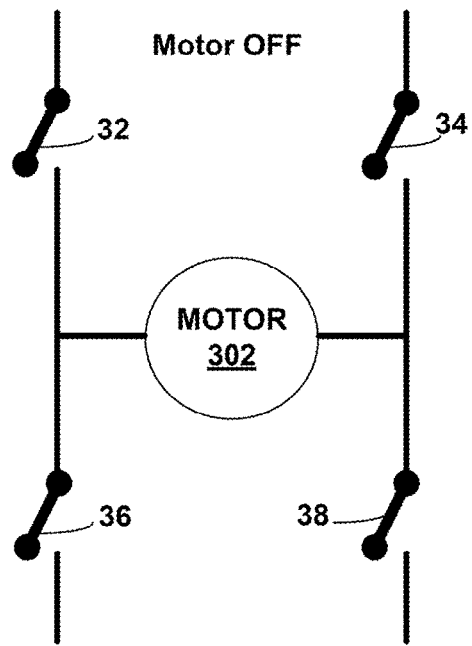
FIGS. 3A-3D are circuit diagrams showing an exemplary H-bridge circuit configured to control an electric motor according to this disclosure.
Figure 3B:
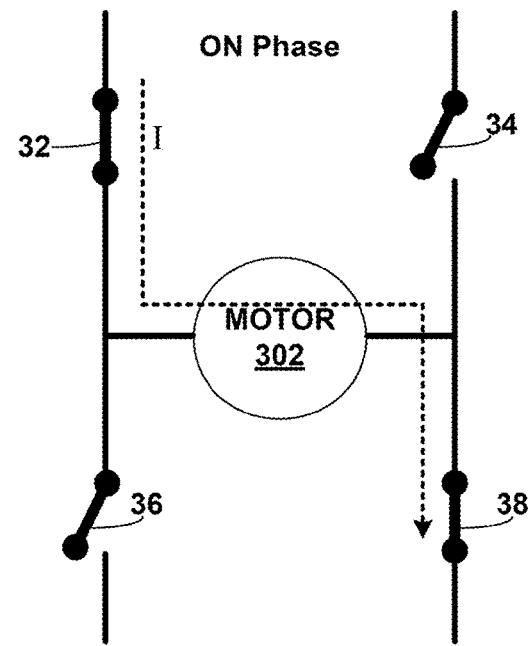
Figure 3C:
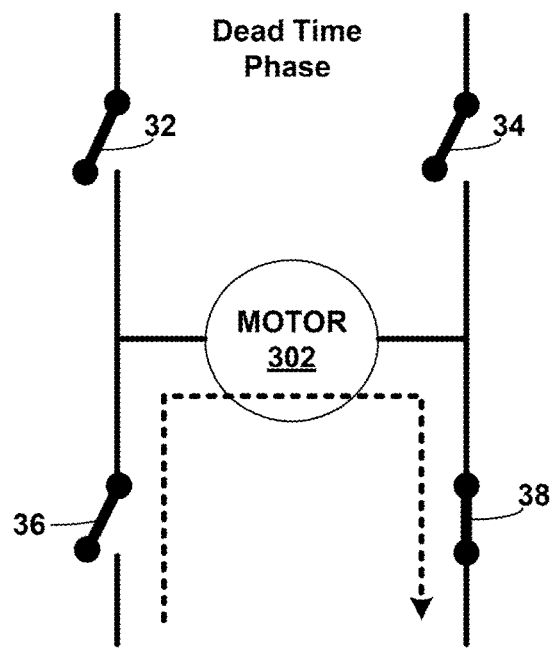
Figure 3D:
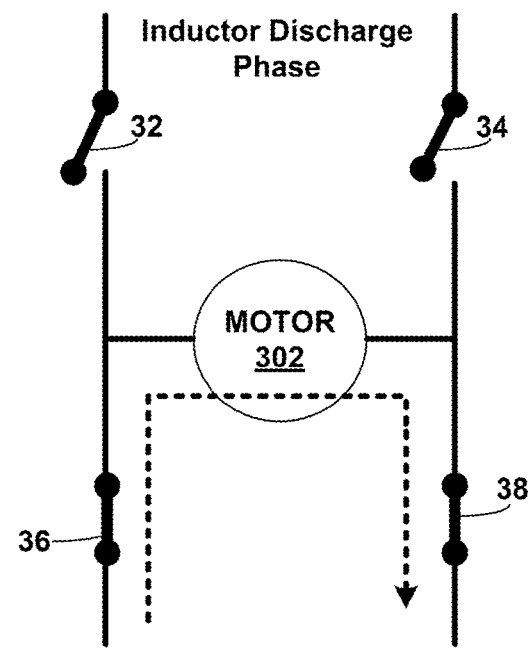

FIG. 3A shows a situation where electric motor 302 is completely turned OFF, and in this state shown in FIG. 3A, all of power switches 32, 34, 36, 38 are OFF. FIG. 3B shows a situation where current is delivered to electric motor 302 by controlling first high-side power switch 32 ON and controlling second low-side power switch 38 ON. In this case, current flows from a high-side supply node through first high-side power switch 32, through electric motor 302 and through second low-side power switch 38 to ground. As part of the motor control cycle, it can be desirable to sink any inductor current from electric motor 302 to ground as part of an overall control cycle, e.g., by controlling first low-side power switch 36 to an ON state while turning high-side power switch 32 to an OFF state as shown in FIG. 3D. However, prior to this "inductor discharge phase" shown in FIG. 3D, a dead time phase as shown in FIG. 3C is desirable to ensure that there is never any undesirable cross conduction where both of power switches 32, 36 are ON. During this so-called "dead time" shown in FIG. 3C, this disclosure may leverage the body diode of low-side power switch 36 for a temperature determination, which can ultimately lead to the determination of current through electric motor 302.

A body diode associated with first low-side power switch 36 may experience a free-wheeling current during the phase shown in FIG. 3C, which may be caused by free-wheeling rotation of electric motor 302 during the dead time. The current through electric motor 302 corresponds to the current $I_{DS}$ through the second low-side power switch 38, and the current through second low-side power switch 38 may be given by:

$$I_{DS} = V_{DS}/R_{DS(ON)}$$

where $I_{DS}$ refers to the drain to source current of second low-side power switch 38, $V_{DS}$ refers to the drain to source voltage of second low-side power switch 38, and $R_{DS(ON)}$ refers to the resistance of second low-side power switch 38. As explained above, $R_{DS(ON)}$ is dependent on junction temperature, and hence, to determine $R_{DS(ON)}$ of second low-side power switch 38, the junction temperature is needed. Processor 10 can determine junction temperature of first low-side power switch 36 during the dead time illustrated in FIG. 3C, and this junction temperature of first low-side power switch 36 can be mapped to the junction temperature of second low-side power switch 38 by adding an offset.

As noted above, processor 10 may use an iterative process in order to determine the junction temperature associated with first low-side power switch 26. For example, processor 10 may be is configured to determine D1, where D1 comprises an estimate of the junction temperature associated with first low-side power switch 36 based on an assumption of a current level. Processor 10 may then determine D2, where D2 comprises an ON resistance associated with first low-side power switch 36 based on the determined estimate of junction temperature. Processor 10 may then determine D3, where D3 comprises a new assumption of the current level based on the determined ON resistance. By iterating this process of determining D1, determining D2, and determining D3 for N cycles, wherein N is a positive integer greater than 2, processor 10 can determine an accurate estimation of the junction temperature associated with first low-side power switch 36 after N cycles. N may be determined by production testing to identify the number of cycles N needed to achieve an accurate estimate of junction temperature. Then, as noted above, the determined junction temperature of first low-side power switch 36 can be mapped to a corresponding junction temperature of second low-side power switch 38 by adding an offset. Moreover, the junction temperature of second low-side power switch 38 can be used to determine $R_{DS(ON)}$ of second low-side power switch 38, which along with a measurement of $V_{DS}$, can provide for a determination of $I_{DS}$ without the need for any shunt resistor.

Again, to iterate the determine D1, the determine D2, and the determine D3 for N cycles, processor 10 may be configured to iterate calculations according to the equations reproduced above.

In some examples, processor 10 accesses LUTs 14 to map a voltage drop over the body diode of low-side power switch 36 during the dead time to a temperature of first low side-power switch 36. Processor 10 can then use the determined temperature of first low side-power switch 36 to identify the temperature of second low-side power switch 38, e.g., based on adding an offset value to the temperature of first low side-power switch 36. Processor 10 can then access LUTs 14 again in order to look up an RDS(on) of second low-side power switch 38. In this case, LUTs 14 of FIG. 1 may represent several look up tables, including a first lookup table for mapping voltage drops over a body diode to temperature, and a second lookup table for mapping temperature values to RDS(on) values. The voltage drop over second low-side power switch 38, e.g., in the phase shown in FIG. 3B, can then be accurately determined by processor 10, since processor 10 has determined an accurate measurement of RDS(on) of second low-side power switch 38.

DC motors and BLDC motors are widely used in applications, e.g., to drive fans, open and close windows, open and close a sunroof, adjust seat positioning, operate pumps, control flaps, as well as many other operations in vehicles. An electric motor in the abstract regard is performing a transformation of electric energy into mechanical energy. This is achieved by the generation of a dynamic magnetic field which changes the position of the rotor of such a motor. The dynamic magnetic field can be in the stator or in the rotor of the motor. The motors can be controlled to run with a constant speed, a constant torque or to be driven in a defined position.

The speed of an electric motor is dependent on the voltage applied, motor-specific electric, magnetic and mechanical characteristics and the load torque. The drive of the motor is done by switches which are usually semiconductor devices like MOSFETs, bipolar transistors or IGBTs. These types of power switches may be applied to the motor in a bridge manner, such as shown in FIGS. 2 and 3A-3D. The bridge of power switches can be a half-bridge, a full bridge, an h-bridge, or H-bridge. The bridge operation allows to control the motor direction by changing the connection to the supply, the motor supply voltage and current (statically or dynamically) and the freewheeling to discharge the motor coil. The power switches (e.g., 22, 24, 26, 28 OR 32, 34, 36, 38) can be either put into a constant state or can be driven with a pulse-width modulation which allows a very accurate control of the on- and off-times of such switches. This can be used to implement a control loop.

For setting up regulation, the electric parameters applied to the motor (202, 302) can be adapted based on feedback from the motor application. Such feedback characteristics can be the angle speed, the torque, the motor current and the position of the rotor in relation to the stator. The feedback of these characteristics can be done via the measurement of the motor current and/or hall sensors which are attached to the motor assembly. One feedback parameter is the motor current. The current is proportional to the torque which is generated by the motor.

The conventional way to measure the motor current is to use a shunt resistor. In this case, a shunt resistor can be switched in series to the motor. The voltage drop across the shunt resistor is proportional to the current through the electric motor. The voltage can be measured either directly one-to-one or amplified. The amplitude of the voltage is a measure for the amplitude of the current and therefore can be used as a regulation parameter.

Because the shunt resistor sees the same current as the motor the resistor is dissipating I2R power, where I is the current and R is the resistance of the shunt. This results in power loss due to the resistor is warming up. Usual motor currents can be in the range of amps to hundreds of amps. Thus, the size of the shunt is chosen as small as possible. Lower limitation on shunt size, however, relates to the measurability of the voltage and the voltage resolution of the instrument applied to the resistor terminals. Usually this is performed by an analog to digital converter (ADC).

The power switches in the motor control bridge are operated with pulse-width-modulated (PWM) signals. PWM signals can be is applied to one or more transistors in the bridge, e.g., a high-side transistor. The other transistor on the opposite low-side can be switched permanently on. During the on-duty cycle of the PWM signal, the current is flowing from a supply through the high-side, the motor, the low-side transistor and finally through the shunt resistor to ground. An inverted PMW signal (i.e., "/PWM") switches on the freewheeling path in the inactive phase of the PWM to discharge the inductances of the motor.

In case the DC motor is used in a motor control bridge with switches and the switches are MOSFET transistors, the current flowing through drain-source of the switch is nearly equal to the motor current. The switches are operated in the so-called triode region. In this region, the behavior of the MOSFET is ohmic and only dependent on the Gate-Source voltage. Due to the fact that in most applications the gate-source voltage is chosen to be high enough to be in the area where the drain-source resistance is nearly independent from the gate-source voltage and only defined by electric characteristics of the FET.

Thus, knowing this transistor operation, in accordance with this disclosure, the shunt resistor can be completely removed from the motor control application. As replacement, the drain-source current sensed by the drain-source voltage of the FET can act as a current monitor. The changed application has now just the bridge and voltage monitoring points at the bridge supply, the high-side source and the low-side drain. With this information, it is now possible to calculate all relevant parameters which can be used for the regulation.

The microcontroller (e.g., processor 10) which is applying the PWM to the motor control bridge knows about all operation states of the controlled FETs and can control also the time when the measurement for the voltage representing the motor current. The current can be measured during the time when the current is flowing from the bridge supply point VDH through the high-side FET, the motor and finally the low-side FET.

For the current measurement, the high-side FET (e.g., power switch 22, 32) or the low-side FET (e.g., power switch 28, 38) can be taken. The voltage measurement may be performed with currentless connections to avoid voltage drops across connection or wiring resistances. This is desirable because the resistances of the power MOSFETs used in the bridge applications are typically in the range of a few milliohms. Therefore, expected voltage drops are in a hundred microvolt or few millivolt range. To be able to convert and record such low voltages the voltage drop may need to be amplified. For this operation, a current amplifier which is usually available for the shunt measurements can be used.

For the measurement at the high-side FET (e.g., power switch 22, 32), all measurement the bridge supply and the high-side source may need to be connected, and the voltage difference between these two points can be measured after amplification with a current sense amplifier. These measurement points may already be available in bridge driver devices, and therefore, no extra pins or wiring may be necessary.

For the measurement at a low-side FET (e.g., power switch 28, 38), the drain and the source of the low-side FET can be connected, and the voltage difference between the drain and the source nodes can be measured after amplification. In some examples, it may be necessary to make the FET drain connection node available to the driver circuit(s) 16 or the processor 10. The source connection is typically already existing in regular application and can be used for the internal circuitry.

In some examples, a procedure for the current measurement in a shuntless operation is the following:
1. Apply the PWM to the high-side FET
2. Apply the inverted PWM to the first low-side FET (LS1)
3. Apply a constant on-voltage to the gate of the second low-side FET (LS2)
4. Measure the voltage drop across either the high-side FET or the second low-side FET during the on-phase of the (non-inverted) PWM
5. Determine RDS(on) of the FET using iterative process
   a. Determine junction temperature of LS1
   b. Determine junction temperature of LS2 by adding offset
   c. Determine RDS(on) based on junction temperature of LS2
   d. Determine current based on measured voltage drop and determined RDS(on)

The proposed solutions described herein can provide a unique feature to bridge driver devices. It is possible to deliver a solution that can help reduce the number of external components. Because of the fact that already existing pins and connections can be used for the shunt-less current measurements, the number of pins at the device can be used or more functionality can be provided with the same number of pins. The freed-up pins can be used to add additional general-purpose input/output (GPIO) pins, analog-to-digital converter (ADC) channels, or other features.

Removing the shunt also may result in a reduction in the power dissipation of such a component. Because of the low resistances the power dissipation is not high, but still can be in the range of some hundred milliwatts to a few watts. Moreover, an improvement of the ground connection of the bridge can be achieved, as the shunt may provide limitations on connections to ground. Without the shunt, the power transistors on the low-side can directly be connected to ground with a strong connection. This reduces ground shifts and moving virtual ground levels.

In different examples, current sensing can be done on a high-side transistor (e.g., power switch 22, 32) or on a low-side transistor (e.g., power switch 28, 38). There is not necessarily any need for additional connection to the bridge driver device. The already existing pins for detecting voltages on nodes of the power switches may already exist. With this setup, an additional 2 pins, which are used conventionally for the current sense amplifier, can be saved and used for a different purpose or eliminated entirely so that the size of the package can be reduced.

Sensing of the motor current may be performed during an "ON" duty cycle of the PWM signals applied to the power switches. The sensing can be done at a high-side or at a low-side transistor.

The resulting voltage is $$V_{sense} = I_{Motor} * R_{on,FET}$$

The on-resistance of the FET ($R_{on,FET}$) can be either measured or defined from the datasheet.

In summary, with the approaches described herein, it is possible to save components, power and pins in a motor control application. The functionality allows the operation in the same manner as with the standard approach. The accuracy of the solution may be dependent on the possibility to determine the on-resistance of the monitored MOSFET.

Figure 4:
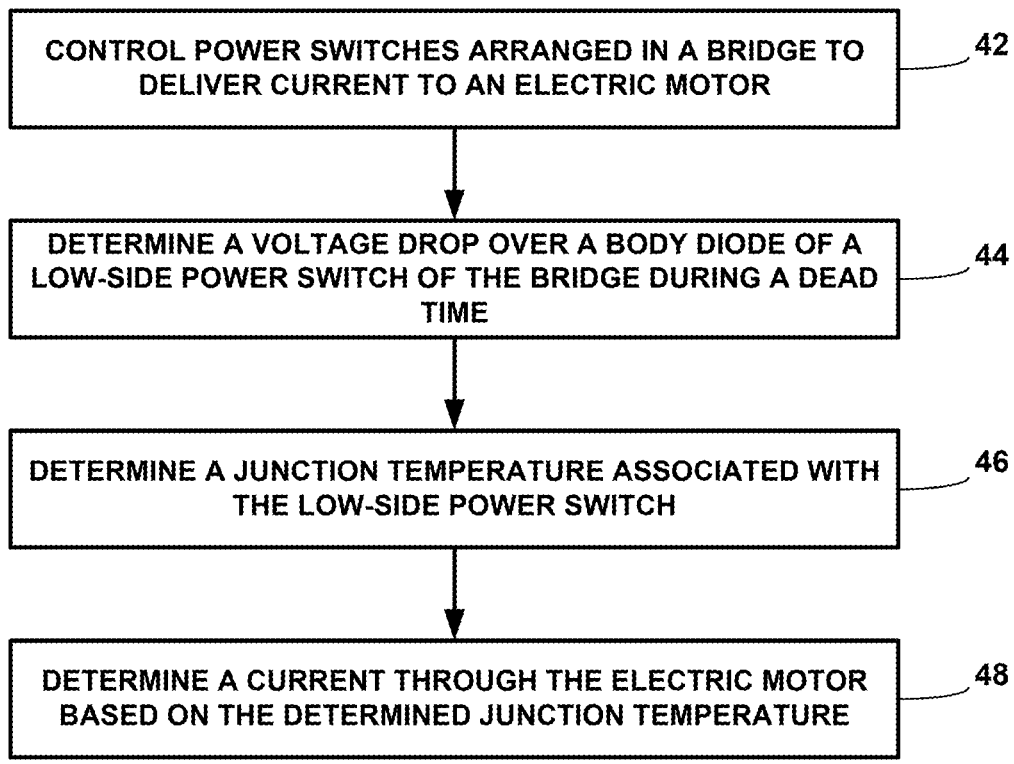
FIGS. 4 and 5 are flow diagrams of techniques that can be performed by a processor to determine current through an electric motor without using a shunt.
Figure 5:
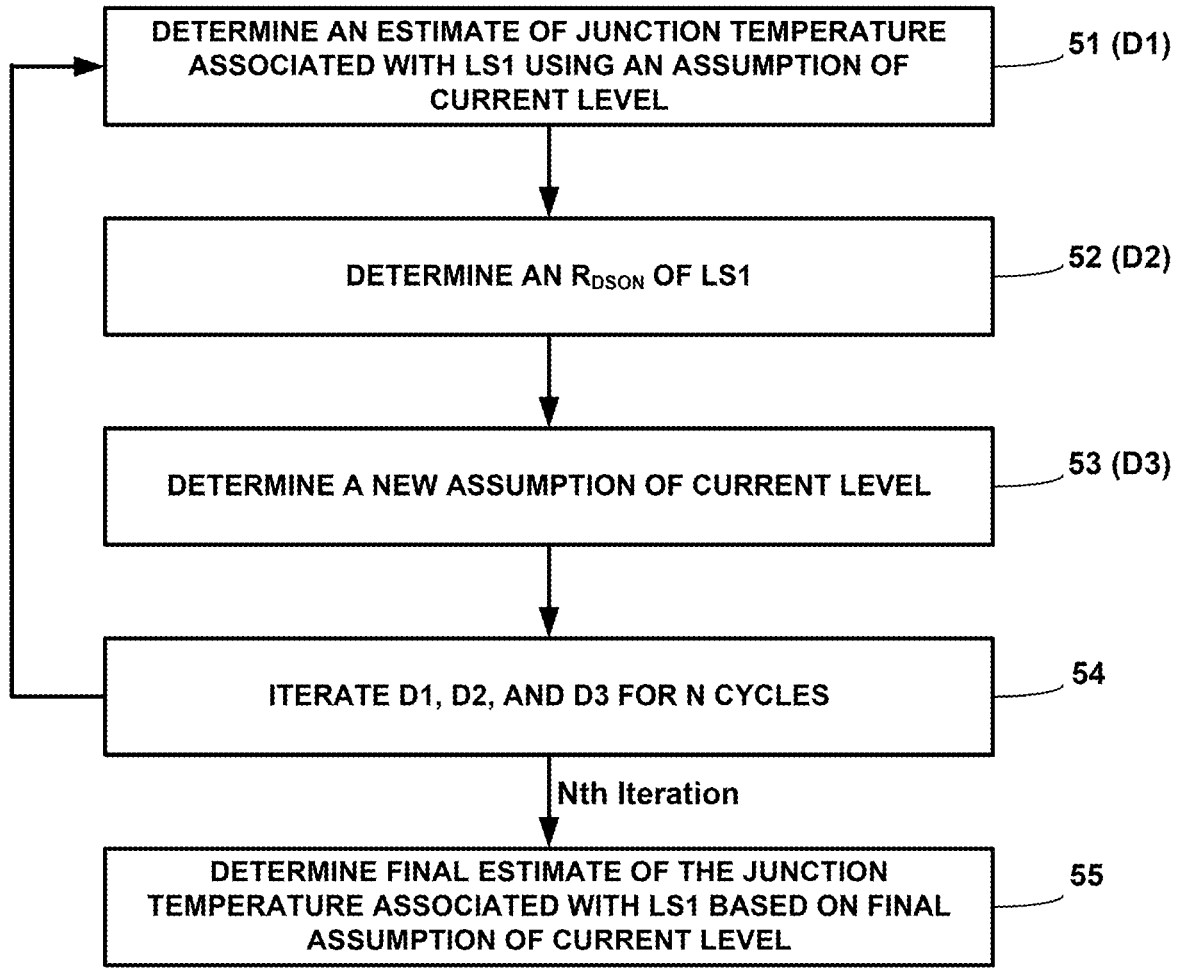

FIGS. 4 and 5 are flow diagrams of techniques that can be performed by a processor 10 to determine current through an electric motor without using a shunt. FIGS. 4 and 5 will be described from the perspective of processor 10 of FIG. 1 in controlling power switches 32, 34, 36, 38 of FIGS. 3A-3D or power switches 22, 24, 26, 28 of FIG. 2. Again, power switches 32, 34, 36, 38 of FIGS. 3A-3D and power switches 22, 24, 26, 28 of FIG. 2 are examples of power switches 18 shown in FIG. 1, and second high-side power switch 24, 34 is optional. Processor 10 may control power switches 32, 34, 36, 38 to deliver a current to electric motor 302. Power switches are arranged in a bridge (e.g., an H-bridge) comprising a first high-side power switch 32, a first low-side power switch 36, and a second low-side power switch 38. A second high-side power switch 34 may also be included if reverse motor operation is supported. In controlling power switches 32, 34, 36, 38 to deliver a current to electric motor 302, processor 10 may be configured to control the first high-side power switch 32 ON and to control the second low-side power switch 38 ON, wherein the current to the electric motor 302 flows through the high-side power switch and through the second low-side power switch as shown in FIG. 3B. Moreover, according to this disclosure, processor 10 may be configured to determine the current to electric motor 302 based on a voltage drop over one of the power switches arranged in the bridge. Referring to FIG. 2, for example, processor 10 may measure $V_{DS}$ shown in FIG. 2, determine temperature of LS1 26, and then determine temperature of LS2 28 based on the determined temperature of LS1 26. Using the temperature of LS2 28, processor 10 may determine $R_{DS(ON)}$ of LS2 28. The current $I_{DS}$ can then be determined by dividing the measured $V_{DS}$ by the determined $R_{DS(ON)}$ of LS2 28.

More specifically, as shown in FIG. 4, processor 10 may be configured to control power switches 32, 34, 36, 38 of FIG. 3A-3D or power switches 22, 24, 26, 28 of FIG. 2 to deliver current to an electric motor 302, 202 (42). Processor 10 may determine a voltage drop over a body diode of a low-side power switch 26, 36 during a dead time (44), e.g., as illustrated in FIG. 3C. Processor 10 may further determine a junction temperature associated with the low-side power switch 26, 26 (46), and may determine a current through electric motor 202, 302 based on the determined junction temperature associated with the low-side power switch 26, 26 (48).

To determine the current through electric motor 302, processor 10 may be configured to: after controlling power switches 32, 34, 36, 38 to deliver the current to electric motor 302, determine a voltage drop over a body diode of first low-side power switch during 36 a dead time shown in FIG. 3C, wherein first high-side power switch 32 and first low-side power switch 36 are controlled OFF during the dead time and the second low-side power switch 38 remains ON during the dead time. Processor 10 may be configured to determine a junction temperature associated with the first low-side power switch based on the determined voltage drop over the body diode of the first low-side power switch 36 during the dead time, and processor 10 may determine the current to electric motor 302 and through second low-side power switch 38 based on the determined junction temperature associated with first low-side power switch 36. The body diode of first low-side power switch 36 experiences a free-wheeling current caused by rotation of motor 302 during the dead time shown in FIG. 3C.

Determining the current through electrical motor 302 may be based on a measured voltage drop over the second low-side power switch 38 when motor 302 is operating as shown in the ON phase of FIG. 3B. The process may include determining a junction temperature associated with second low-side power switch 38 based on the junction temperature associated with the first low-side power switch 36 and a predefined offset value stored in memory 12. The offset value may map junction temperatures of first low-side power switch 36 to junction temperatures of second low-side power switch 38, and the offset can be determined during production. The process may further include determining an ON resistance associated with second low-side power switch 38 based on the junction temperature associated with the second low-side power switch 38 and determining the current through electrical motor 302 based on the voltage drop over the second low side power switch 38 and the ON resistance associated with the second low-side power switch 38. Processor 10 may be configured to determine the junction temperature associated with first low-side power switch 36 by performing a first lookup operation in LUTs 14 based on the voltage drop over the body diode of first low-side power switch 36 during the dead time. In addition, processor 10 may be configured to determine the ON resistance associated with second low-side power switch 38 based on the junction temperature associated with the second low-side power switch 38 by performing a second lookup operation in LUTs 14 based on the determined junction temperature associated with the second low-side power switch 38.

As further shown in FIG. 5, processor 10 may execute an iterative process in determining the junction temperature associated with first low-side power switch LS1 26, 36. In particular, processor 10 may determine D1 comprising an estimate of the junction temperature associated with the first low-side power switch based on an assumption of a current level (51), and determine D2 comprising an ON resistance ($R_{DSON}$) associated with first low-side power switch LS1 26, 36 based on the determined estimate of junction temperature (52). Processor 10 may further determine D3 comprising a new assumption of the current level based on the determined ON resistance (53), and processor 10 may iterate the determining D1, the determining D2, and the determining D3 for N cycles (54), wherein N is a positive integer greater than 2. After N iterations, processor 10 can determine a final estimate of the junction temperature associated with first low-side power switch LS1 26, 36 based on a final assumption of current level (55), which should be an accurate estimation of current after the N iterations of the process.

In determining D1, determining D2, and determining D3 for N cycles, processor 10 may iterate calculations according to equations:

$$T = \frac{aV_B}{\ln\left(\frac{I}{I_{sat}}\right)} + b$$

-continued $$R_{DSon} = f(T)$$

$$I = \frac{V_D}{RDSon}$$

wherein T represents the junction temperature, a represents a first predefined constant, b represents a second predefined constant, ln represents a natural logarithm function, $I_{sat}$ represents a current level where saturation occurs in the first low-side power switch, $V_B$ represents the voltage drop over the body diode of the first low-side power switch during the dead time, $R_{DSon}$ represents a drain-to-source resistance of the first low-side power switch in an ON state, f(T) represents a function based on T, I represents the current level, and $V_D$ represents a voltage drop over the second low-side power switch. In some examples according to this disclosure, iterating is automatically performed during pulse modulation cycles applied to first low-side power switch LS1 26, 36, wherein a final determination of the junction temperature is defined in an Nth pulse modulation cycle, wherein N is pre-defined based on production testing.

Electric motor 202, 302 may comprise a DC motor, such as a BLDC motor. Power switches 18 may be arranged in an h-bridge comprising the first high-side power switch 22, 32, the first low-side power switch 26, 36, and the second low-side power switch 28, 36, or arranged in an H-bridge comprising the first high-side power switch 22, 32, a second high-side power switch 24, 34, the first low-side power switch 26, 36, and the second low-side power switch 28, 38. Again, second high-side power switch 24, 34 is optional and may be included (or controlled) only if reverse motor control is supported. In some case, the power switches are arranged in the H-bridge, but the second high-side power switch 26, 26 is always turned OFF such that the H-bridge operates like the h-bridge. The techniques described in this disclosure can enable a current control loop for an electric motor, without any shunt resistor needed for determining the current through the electric motor. Processor 10 may regulate the current to electric motor 102, 202, 302 based on current determinations performed via the shunt-less processes described herein.

The techniques described in this disclosure may be implemented, at least in part, in circuitry, hardware, software, firmware or any combination thereof. For example, various aspects of the described techniques may be implemented within one or more logical elements, processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

It may also be possible for one or more aspects of this disclosure to be performed in software, in which case those aspects of the techniques described in this disclosure may also be embodied or encoded in a computer-readable medium, such as a computer-readable storage medium, containing instructions. Instructions embedded or encoded in a computer-readable storage medium may cause processor 10, to perform the method, e.g., when the instructions are executed. The instructions, in this example, may be stored in memory 12, which may comprise random access memory (RAM), read only memory (ROM), programmable read only memory (PROM), erasable programmable read only memory (EPROM), electronically erasable programmable read only memory (EEPROM), flash memory, or other computer readable media.

The following clauses may illustrate one or more aspects of the disclosure.

Clause 1—A method comprising: controlling power switches to deliver a current to an electric motor, wherein the power switches are arranged in a bridge comprising a first high-side power switch, a first low-side power switch, and a second low-side power switch, wherein controlling the power switches to deliver the current to the electric motor includes controlling the first high-side power switch ON and controlling the second low-side power switch ON, wherein the current to the electric motor flows through the high-side power switch and through the second low-side power switch; and determining the current to the electric motor based on a voltage drop over one of the power switches arranged in the bridge.

Clause 2—The method of clause 1, wherein determining the current includes: after controlling the power switches to deliver the current to the electric motor, determining a voltage drop over a body diode of the first low-side power switch during a dead time, wherein the high-side power switch and the first low-side power switch are controlled OFF during the dead time and the second low-side power switch remains ON during the dead time; determining a junction temperature associated with the first low-side power switch based on the determined voltage drop over the body diode of the first low-side power switch during the dead time; and determining the current to the electric motor and through the second low-side power switch based on the determined junction temperature associated with the first low-side power switch.

Clause 3—The method of clause 2, wherein the body diode of the first low-side power switch experiences a free-wheeling current caused by rotation of the electric motor during the dead time.

Clause 4—The method of clause 2 or 3, wherein determining the junction temperature includes: determining D1 comprising an estimate of the junction temperature associated with the first low-side power switch based on an assumption of a current level, determining D2 comprising an ON resistance associated with the first low-side power switch based on the determined estimate of junction temperature, determining D3 comprising a new assumption of the current level based on the determined ON resistance, and iterating the determining D1, the determining D2, and the determining D3 for N cycles, wherein N is a positive integer greater than 2.

Clause 5 The method of clause 4, wherein iterating the determining D1, the determining D2, and the determining D3 for N cycles comprises iterating calculations according to equations:

$$T = \frac{aV_B}{\ln\left(\frac{I}{I_{sat}}\right)} + b$$

$$R_{DSon} = f(T)$$

$$I = \frac{V_D}{RDSon}$$

wherein T represents the junction temperature, a represents a first predefined constant, b represents a second predefined constant, ln represents a natural logarithm function, $I_{sat}$ represents a current level where saturation occurs in the first low-side power switch, $V_B$ represents the voltage drop over the body diode of the first low-side power switch during the dead time, $R_{DSon}$ represents a drain-to-source resistance of the first low-side power switch in an ON state, f(T) represents a function based on T, I represents the current level, and $V_D$ represents a voltage drop over the second low-side power switch.

Clause 6—The method of clause 4 or 5, wherein the iterating is performed automatically during pulse modulation cycles applied to the first low-side power switch, wherein a final determination of the junction temperature is defined in an Nth pulse modulation cycle, wherein N is pre-defined based on production testing.

Clause 7—The method of any of clauses 4-6, wherein determining the current through the electrical motor based on the voltage drop over one of the power switches comprises determining the current through the electrical motor based on a voltage drop over the second low-side power switch, wherein the method includes: determining a junction temperature associated with the second low-side power switch based on the junction temperature associated with the first low-side power switch and an offset value; determining an ON resistance associated with the second low-side power switch based on the junction temperature associated with the second low-side power switch; and determining the current through the electrical motor based on the voltage drop over the second low side power switch and the ON resistance associated with the second low-side power switch.

Clause 8—The method of clause 7, wherein: determining the junction temperature associated with the first low-side power switch comprises performing a first lookup operation based on the voltage drop over the body diode of the first low-side power switch during the dead time; and determining the ON resistance associated with the second low-side power switch based on the junction temperature associated with the second low-side power switch comprises performing a second lookup operation based on the junction temperature associated with the second low-side power switch.

Clause 9—The method of any of clauses 1-8, wherein the electric motor comprises one of: a DC motor; and a BLDC motor.

Clause 10—The method of any of clauses 1-9, wherein the power switches are arranged in: an h-bridge comprising the first high-side power switch, the first low-side power switch, and the second low-side power switch; OR an H-bridge comprising the first high-side power switch, a second high-side power switch, the first low-side power switch, and the second low-side power switch.

Clause 11—The method of clause 10, wherein the power switches are arranged in the H-bridge and the second high-side power switch is always turned OFF such that the H-bridge operates like the h-bridge.

Clause 12—A processor configured to: control power switches to deliver a current to an electric motor, wherein the power switches are arranged in a bridge comprising a first high-side power switch, a first low-side power switch, and a second low-side power switch, wherein controlling the power switches to deliver the current to the electric motor includes controlling the first high-side power switch ON and controlling the second low-side power switch ON, wherein the current to the electric motor flows through the high-side power switch and through the second low-side power switch; and determine a current through the electric motor based on a voltage drop over one of the power switches arranged in the bridge.

Clause 13—The processor of clause 12, wherein to determine the current, the processor is configured to: after controlling the power switches to deliver the current to an electric motor, determine a voltage drop over a body diode of the first low-side power switch during a dead time, wherein the first high-side power switch and the first low-side power switch are controlled OFF during the dead time; determine a junction temperature associated with the first low-side power switch based on the determined voltage drop over the body diode of the first low-side power switch during the dead time; and determine the current to the electric motor and through the second low-side power switch based on the determined junction temperature associated with the first low-side power switch.

Clause 14—The processor of clause 13, wherein the body diode of the first low-side power switch experiences a free-wheeling current caused by rotation of the electric motor during the dead time.

Clause 15—The processor of clause 13 or 14, wherein to determine the junction temperature, the processor is configured to: determine D1 comprising an estimate of the junction temperature associated with the first low-side power switch based on an assumption of a current level, determine D2 comprising an ON resistance associated with the first low-side power switch based on the determined estimate of junction temperature, determine D3 comprising a new assumption of the current level based on the determined ON resistance, and iterate the determine D1, the determine D2, and the determine D3 for N cycles, wherein N is a positive integer greater than 2.

Clause 16—The processor of clause 15, wherein to iterate the determine D1, the determine D2, and the determine D3 for N cycles the processor is configured to iterate calculations according to equations:

$$T = \frac{aV_B}{\ln\left(\frac{I}{I_{sat}}\right)} + b$$

$$R_{DSon} = f(T)$$

$$I = \frac{V_D}{RDSon}$$

wherein T represents the junction temperature, a represents a first predefined constant, b represents a second predefined constant, ln represents a natural logarithm function, $I_{sat}$ represents a current level where saturation occurs in the first low-side power switch, $V_B$ represents the voltage drop over the body diode of the first low-side power switch during the dead time, $R_{DSon}$ represents a drain-to-source resistance of the first low-side power switch in an ON state, f(T) represents a function based on T, I represents the current level, and $V_D$ represents a voltage drop over the second low-side power switch.

Clause 17—The processor of clause 15 or 16, wherein the processor is configured to automatically iterate during pulse modulation cycles applied to the first low-side power switch, wherein a final determination of the junction temperature is defined by the processor in an Nth pulse modulation cycle, wherein N is pre-defined based on production testing.

Clause 18—The processor of any of clauses 15-17, wherein the voltage drop over one of the power switches comprises a voltage drop over the second low-side power switch, wherein the processor is configured to: determine a junction temperature associated with the second low-side power switch based on the junction temperature associated with the first low-side power switch and an offset value; determine an ON resistance associated with the second low-side power switch based on the junction temperature associated with the second low-side power switch; and determine the current through the electrical motor based on the voltage drop over the second low side power switch and the ON resistance associated with the second low-side power switch.

Clause 19—The processor of clause 18, wherein the processor is configured to: determine the junction temperature associated with the first low-side power switch by performing a first lookup operation based on the voltage drop over the body diode of the first low-side power switch during the dead time; and determine the ON resistance associated with the second low-side power switch based on the junction temperature associated with the second low-side power switch by performing a second lookup operation based on the junction temperature associated with the second low-side power switch.

Clause 20—The processor of any of clauses 12-19, wherein the electric motor comprises: a DC motor wherein the bridge is configured to control the DC motor; or a BLDC motor wherein the bridge is configured to control the BLDC motor, and wherein: the power switches are arranged in: an h-bridge comprising the first high-side power switch, the first low-side power switch, and the second low-side power switch; OR an H-bridge comprising the first high-side power switch, a second high-side power switch, the first low-side power switch, and the second low-side power switch.

Clause 21—The processor of any of clauses 12-20, wherein to control power switches, the processor is configured to send commands to one or more driver circuits to cause the one or more driver circuits to generate pulse modulation signals to be applied at gates of the power switches.

Various features and aspects have been described in this disclosure. These and other features and aspects are within the scope of the following claims.

The invention claimed is:
1. A method comprising:
controlling power switches to deliver a current to an electric motor, wherein the power switches are arranged in a bridge comprising a first high-side power switch, a first low-side power switch, and a second low-side power switch, wherein controlling the power switches to deliver the current to the electric motor includes controlling the first high-side power switch ON and controlling the second low-side power switch ON, wherein the current to the electric motor flows through the high-side power switch and through the second low-side power switch; and determining the current to the electric motor based on a voltage drop over one of the power switches arranged in the bridge, wherein determining the current includes:

after controlling the power switches to deliver the current to the electric motor, determining a voltage drop over a body diode of the first low-side power switch during a dead time, wherein the high-side power switch and the first low-side power switch are controlled OFF during the dead time and the second low-side power switch remains ON during the dead time;

determining a junction temperature associated with the first low-side power switch based on the determined voltage drop over the body diode of the first low-side power switch during the dead time; and determining the current to the electric motor and through the second low-side power switch based on the determined junction temperature associated with the first low-side power switch.

2. The method of claim 1, wherein the body diode of the first low-side power switch experiences a free-wheeling current caused by rotation of the electric motor during the dead time.

3. The method of claim 1, wherein determining the junction temperature includes:

determining D1 comprising an estimate of the junction temperature associated with the first low-side power switch based on an assumption of a current level, determining D2 comprising an ON resistance associated with the first low-side power switch based on the determined estimate of junction temperature, determining D3 comprising a new assumption of the current level based on the determined ON resistance, and iterating the determining D1, the determining D2, and the determining D3 for N cycles, wherein N is a positive integer greater than 2.

4. The method of claim 3, wherein iterating the determining D1, the determining D2, and the determining D3 for N cycles comprises iterating calculations according to equations:

$$T = \frac{aV_B}{\ln\left(\frac{I}{I_{sat}}\right)} + b$$

$$R_{DSon} = f(T)$$

$$I = \frac{V_D}{RDSon}$$

wherein

T represents the junction temperature,
a represents a first predefined constant,
b represents a second predefined constant,
ln represents a natural logarithm function,
$I_{sat}$ represents a current level where saturation occurs in the first low-side power switch,
$V_B$ represents the voltage drop over the body diode of the first low-side power switch during the dead time,
$R_{DSon}$ represents a drain-to-source resistance of the first low-side power switch in an ON state,
f(T) represents a function based on T,
I represents the current level, and $V_D$ represents a voltage drop over the second low-side power switch.

5. The method of claim 3, wherein the iterating is performed automatically during pulse modulation cycles applied to the first low-side power switch, wherein a final determination of the junction temperature is defined in an Nth pulse modulation cycle, wherein N is pre-defined based on production testing.

6. The method of claim 3, wherein determining the current through the electrical motor based on the voltage drop over one of the power switches comprises determining the current through the electrical motor based on a voltage drop over the second low-side power switch, wherein the method includes:

determining a junction temperature associated with the second low-side power switch based on the junction temperature associated with the first low-side power switch and an offset value;

determining an ON resistance associated with the second low-side power switch based on the junction temperature associated with the second low-side power switch; and determining the current through the electrical motor based on the voltage drop over the second low side power switch and the ON resistance associated with the second low-side power switch.

7. The method of claim 6, wherein:

determining the junction temperature associated with the first low-side power switch comprises performing a first lookup operation based on the voltage drop over the body diode of the first low-side power switch during the dead time; and determining the ON resistance associated with the second low-side power switch based on the junction temperature associated with the second low-side power switch comprises performing a second lookup operation based on the junction temperature associated with the second low-side power switch.

8. The method of claim 1, wherein the electric motor comprises one of:

a direct current (DC) motor; and
a brushless direct current (BLDC) motor.

9. The method of claim 1, wherein the power switches are arranged in:

an h-bridge comprising the first high-side power switch, the first low-side power switch, and the second low-side power switch; OR an H-bridge comprising the first high-side power switch, a second high-side power switch, the first low-side power switch, and the second low-side power switch.

10. The method of claim 9, wherein the power switches are arranged in the H-bridge and the second high-side power switch is always turned OFF such that the H-bridge operates like the h-bridge.

11. A processor configured to:

control power switches to deliver a current to an electric motor, wherein the power switches are arranged in a bridge comprising a first high-side power switch, a first low-side power switch, and a second low-side power switch, wherein controlling the power switches to deliver the current to the electric motor includes controlling the first high-side power switch ON and controlling the second low-side power switch ON, wherein the current to the electric motor flows through the high-side power switch and through the second low-side power switch; and determine a current through the electric motor based on a voltage drop over one of the power switches arranged in the bridge, wherein to determine the current, the processor is configured to:

after controlling the power switches to deliver the current to an electric motor, determine a voltage drop over a body diode of the first low-side power switch during a dead time, wherein the first high-side power switch and the first low-side power switch are controlled OFF during the dead time;

determine a junction temperature associated with the first low-side power switch based on the determined voltage drop over the body diode of the first low-side power switch during the dead time; and determine the current to the electric motor and through the second low-side power switch based on the determined junction temperature associated with the first low-side power switch.

12. The processor of claim 11, wherein the body diode of the first low-side power switch experiences a free-wheeling current caused by rotation of the electric motor during the dead time.

13. The processor of claim 11, wherein to determine the junction temperature, the processor is configured to:

determine D1 comprising an estimate of the junction temperature associated with the first low-side power switch based on an assumption of a current level, determine D2 comprising an ON resistance associated with the first low-side power switch based on the determined estimate of junction temperature, determine D3 comprising a new assumption of the current level based on the determined ON resistance, and iterate the determine D1, the determine D2, and the determine D3 for N cycles, wherein N is a positive integer greater than 2.

14. The processor of claim 13, wherein to iterate the determine D1, the determine D2, and the determine D3 for N cycles the processor is configured to iterate calculations according to equations:

$$T = \frac{aV_B}{\ln\left(\frac{I}{I_{sat}}\right)} + b$$

$$R_{DSon} = f(T)$$

$$I = \frac{V_D}{RDSon}$$

wherein

T represents the junction temperature,
a represents a first predefined constant,
b represents a second predefined constant,
ln represents a natural logarithm function,
$I_{sat}$ represents a current level where saturation occurs in the first low-side power switch,
$V_B$ represents the voltage drop over the body diode of the first low-side power switch during the dead time,
$R_{DSon}$ represents a drain-to-source resistance of the first low-side power switch in an ON state,
f(T) represents a function based on T,
I represents the current level, and
$V_D$ represents a voltage drop over the second low-side power switch.

15. The processor of claim 13, wherein the processor is configured to automatically iterate during pulse modulation cycles applied to the first low-side power switch, wherein a final determination of the junction temperature is defined by the processor in an Nth pulse modulation cycle, wherein N is pre-defined based on production testing.

16. The processor of claim 13, wherein the voltage drop over one of the power switches comprises a voltage drop over the second low-side power switch, wherein the processor is configured to:

determine a junction temperature associated with the second low-side power switch based on the junction temperature associated with the first low-side power switch and an offset value;

determine an ON resistance associated with the second low-side power switch based on the junction temperature associated with the second low-side power switch; and determine the current through the electrical motor based on the voltage drop over the second low side power switch and the ON resistance associated with the second low-side power switch.

17. The processor of claim 16, wherein the processor is configured to:

determine the junction temperature associated with the first low-side power switch by performing a first lookup operation based on the voltage drop over the body diode of the first low-side power switch during the dead time; and determine the ON resistance associated with the second low-side power switch based on the junction temperature associated with the second low-side power switch by performing a second lookup operation based on the junction temperature associated with the second low-side power switch.

18. The processor of claim 11, wherein the electric motor comprises:

a direct current (DC) motor wherein the bridge is configured to control the DC motor; or a brushless direct current (BLDC) motor wherein the bridge is configured to control the BLDC motor, and wherein:

the power switches are arranged in:

an h-bridge comprising the first high-side power switch, the first low-side power switch, and the second low-side power switch; OR an H-bridge comprising the first high-side power switch, a second high-side power switch, the first low-side power switch, and the second low-side power switch.

19. The processor of claim 11, wherein to control power switches, the processor is configured to send commands to one or more driver circuits to cause the one or more driver circuits to generate pulse modulation signals to be applied at gates of the power switches.

* * * * *